March 12, 1963  E. L. DECKER  3,080,758
MUD GAUGE
Filed April 23, 1959  2 Sheets-Sheet 1
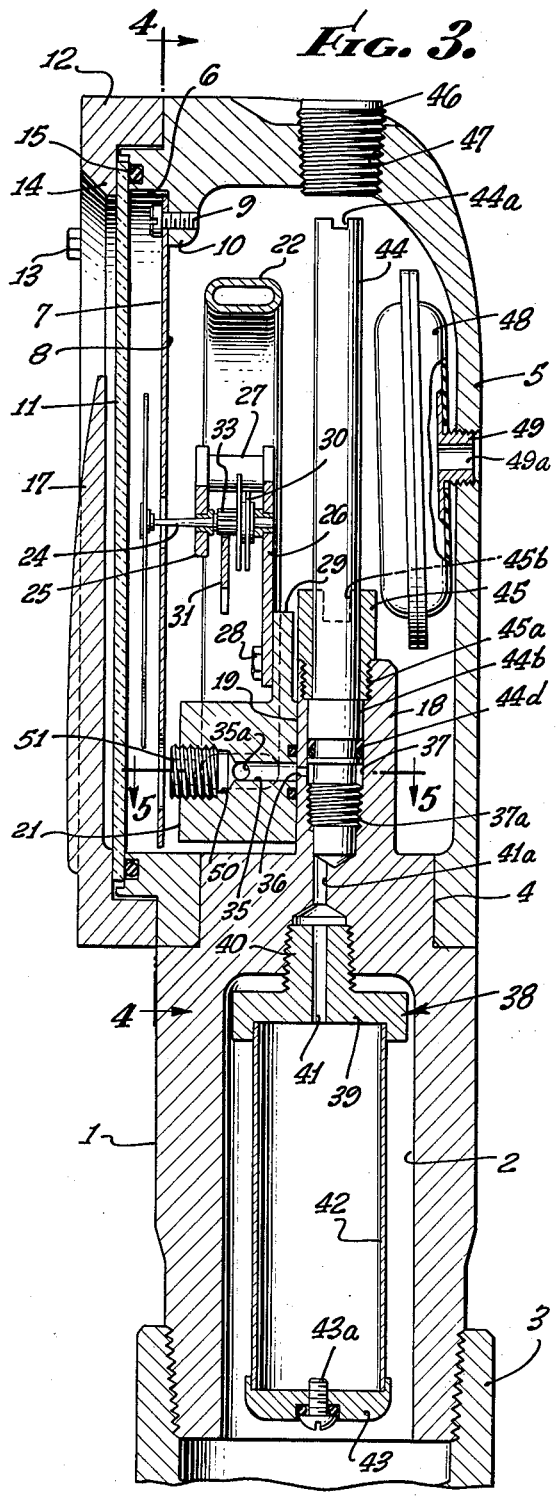
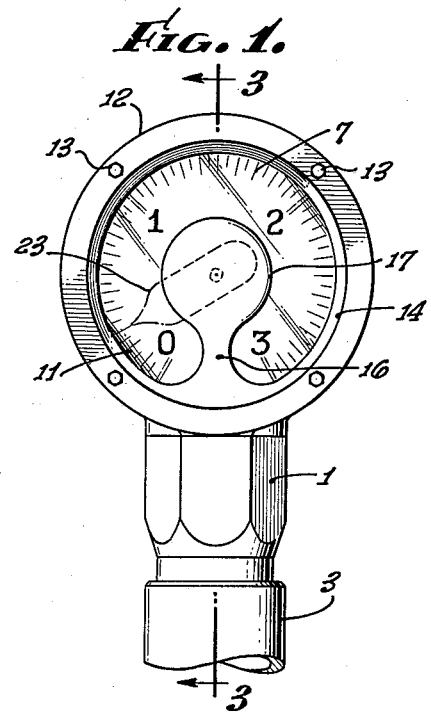
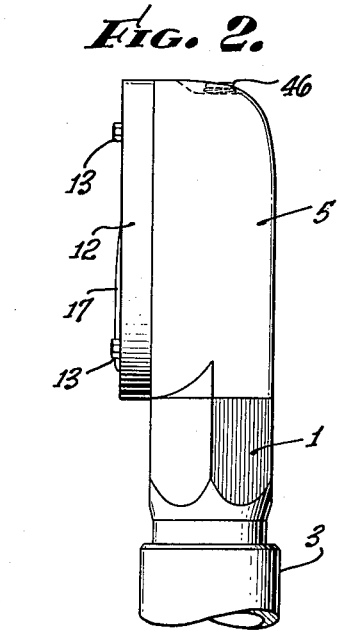
INVENTOR.
ELMER L. DECKER
BY
Paul A. Weilein
ATTORNEY.

March 12, 1963
E. L. DECKER
3,080,758
MUD GAUGE
Filed April 23, 1959
2 Sheets-Sheet 2
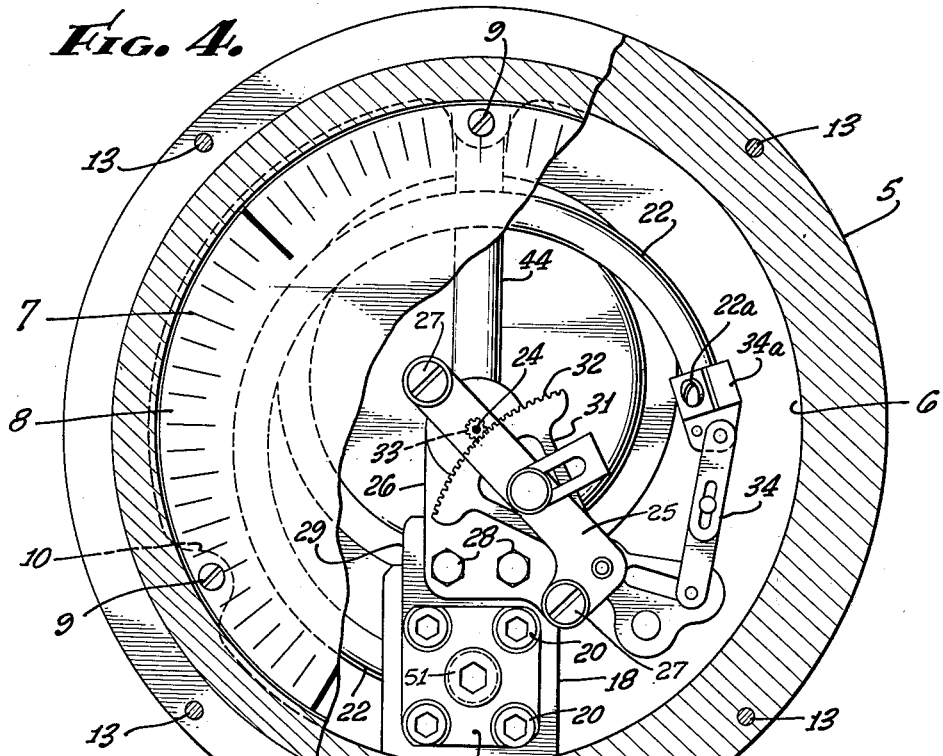
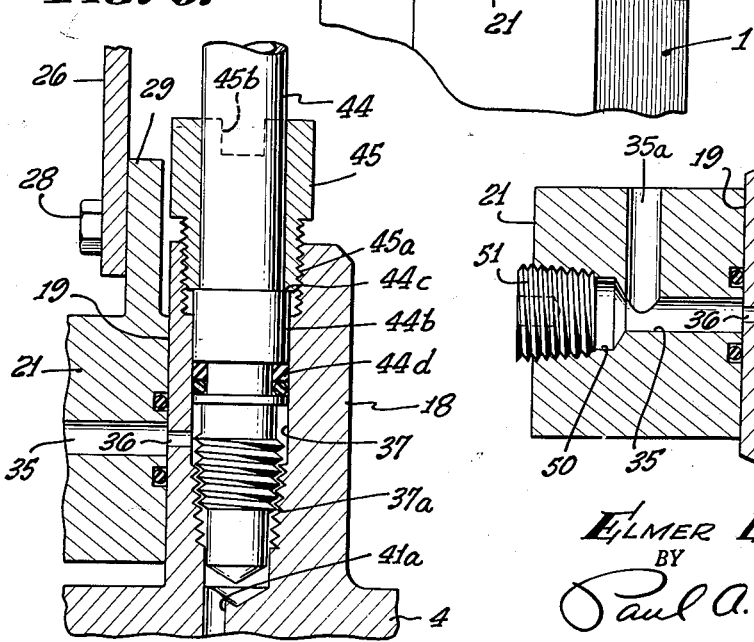
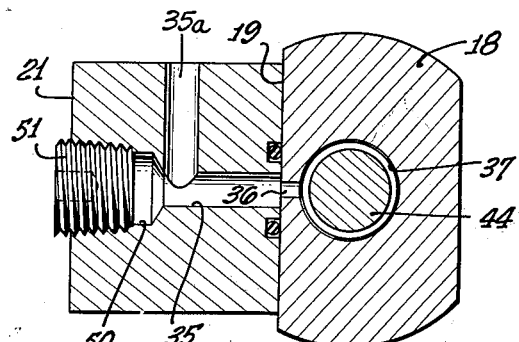
INVENTOR.
ELMER L. DECKER
BY
Paul A. Weilein
ATTORNEY.

United States Patent Office 3,080,758
Patented Mar. 12, 1963

3,080,758
MUD GAUGE
Elmer L. Decker, Long Beach, Calif., assignor to Martin-Decker Corporation, Long Beach, Calif., a corporation of Delaware
Filed Apr. 23, 1959, Ser. No. 808,464
2 Claims. (Cl. 73—414)

The present invention relates to fluid pressure gauges, and more particularly to a unitized mud pressure gauge for use on well drilling rigs or the like.

In the drilling of oil and gas wells by the rotary drilling method, drilling fluid or mud is pumped under pressure down through the rotary drill string. It is desirable that the driller be aware of the mud pressure for various reasons. For instance, the mud is pumped down through the drill string and returns to the mud tank at the surface for recirculation. Unusual variations in pressure in the line between the rotary swivel and the mud pumps may be indicative of undesirable down-hole conditions such as blocked circulation or lost circulation, such as where the fluid is passing from the well bore into a subterranean cavern and is not returning to the surface.

The present invention particularly relates to a mud pressure gauge adapted to be connected as a unit to a branch conduit of the mud system between the mud pump and the drill string. However, the features of the invention may also be availed of for other pressure gauges.

Conventionally, Bourdon tube type gauges have been employed for indicating mud pressure. These gauges are filled with fluid which is separated from the drilling fluid or mud by a diaphragm.

One problem frequently encountered in such conventional gauges is the fact that the diaphragm may be pulled from its mounting when subjected to suction on one side.

An object of the present invention, therefore, is to provide a mud gauge having a durable pressure responsive probe or sensing means which eliminates the use of a diaphragm with attendant advantages.

Another object is to provide a pressure gauge which may be readily filled with liquid while air is bled from the pressure responsive system. To this end, the pressure gauge includes a bleed at the extremity of the pressure sensing probe, as well as a bleed at the end of the Bourdon tube, so that when the system, including the probe and the Bourdon tube are filled with liquid as by filling with fluid at a point in the system between the probe and the Bourdon tube, air will be effectively purged from the system. In purging the system of air, either the Bourdon tube bleed or the probe bleed would, of course, be disposed uppermost and opened while the other bleed remains closed.

In a mud gauge, in accordance with the preceding object, a pulsation damper is provided, substantially in the form of a needle valve, which would be opened during filling of the pressure responsive system. As a further object hereof, the gauge is provided with means for limiting opening of the dampener valve during normal usage so as to preclude the possibility of the pressure responsive system being subjected to abnormal pressure pulses or surges.

Additionally, conventional mud gauges are partilly filled with liquid for damping movement of the gauge parts responsive to pressure pulses from the conventional reciprocating piston type mud pumps. Since the volume of liquid in the gauge is constantly varying due to temperature changes, the gauges have heretofore been filled only partially so as to leave a dead air space, whereby to accommodate the expansion and contraction of fluid in the gauge.

A further object of this invention is to provide a gauge which may be completely filled with liquid, thus avoiding an unsightly liquid level exposed across the face of the dial as in the aforesaid conventional gauges.

In furtherence of this objective, a bladder filled with a compressible fluid or gas vented to atmosphere is disposed in the gauge housing, whereby the gauge may be completely filled with liquid and the bladder will allow expansion and contraction of the liquid in the gauge.

In conventional mud pressure gauges a filler opening is provided for filling the gauge with liquid. An additional object of the invention is to provide a mud gauge wherein the filler plug is located at the top of the gauge and in alignment with the end of the Bourdon tube fluid damper stem, so that a screw driver or the like may be inserted through the filler opening to effect adjustment of the damper.

Other objects, advantages and features of the invention will be hereinafter described, or will become apparent to those skilled in the art, and the novel features will be defined in the appended claims.

In the accompanying drawings:
FIG. 1 is a view in front elevation of a unitary mud gauge assembly made in accordance with the invention;
FIG. 2 is a side elevational view of the gauge of FIG. 1;
FIG. 3 is an enlarged view in vertical section, as taken on the line 3—3 of FIG. 1 but with some parts omitted for clarity of illustration;
FIG. 4 is an enlarged view in vertical section, as taken on the line 4—4 of FIG. 3;
FIG. 5 is a fragmentary transverse sectional view as taken on the line 5—5 of FIG. 3; and
FIG. 6 is an enlarged fragmentary detail view in section, more particularly illustrating the pulsation dampener mounting.

The illustrative embodiment of a mud gauge shown in the accompanying drawings includes a connector base 1 of hexagonal or other cross section having a central bore 2 and external threads for engagement with cooperative threads on the free end of a pipe 3 which, for example, may be a branch from the mud system of a drilling rig. At an intermediate section of the base 1 is a cylindrical portion 4 on which is shrunk or otherwise suitably mounted a hollow housing 5. At one side of the housing 5, it is provided with an opening 6 through which a dial face 7 may be viewed, the dial face 7 being provided on a disc 8 which is connected to the housing 5 by means of a screw 9 extending through the disc and into a depending lug 10 at the upper end of the housing 5.

Closing the opening 6 is a transparent closure 11 which is retained in place on the housing by means of a ring 12 which is secured to the housing by means of a suitable number of circumferentially spaced screws 13 or the like. The ring 12 is provided with a flange 14 overlying a portion of the housing 5 in parallel relation thereto so as to grip the marginal edge of the transparent closure 11 therebetween, with an O-ring or other seal 15 interposed between the transparent closure 11 and the housing 5 so as to effectively seal the sight opening.

Extending upwardly from the base of the ring is a stem 16 on which is a circular shield 17, whereby an arcuate section of the dial face 7 is visible between the shield 17 and the inner periphery of the flange 14 of the ring 12.

Upstanding from the cylindrical central section 4 of the base 1 is a neck 18 having a flat face 19 to which is affixed by means of a suitable number of screws 20 or the like, a mounting base 21 having a Bourdon tube 22 projecting therefrom.

More or less conventional Bourdon tube operated indicating means is adapted to be operated responsive to fluctuations of fluid pressure in the Bourdon tube. This indicating means generally comprises a pointer 23 which is connected to a pinion shaft 24, this shaft being journalled in opposed plates 25 and 26 which are interconnected at a plurality of points as at 27 in parallel spaced relation, the plate 26 being screw fastened as by screws 28 to an upstanding flange 29 on the Bourdon tube mounting base 21. Hair spring means 30 are employed to urge the pointer 23 towards a zero indication, that is in a counter-clockwise direction, while a quadrant 31 having teeth 32 engaged with the pinion 33 on the pinion shaft and having a connecting linkage 34 with the Bourdon tube 22 actuates the pointer 23 to a fluid pressure indicating position, in a clockwise direction.

It should be noted that the linkage 34 is connected to a connector 34a having a bleeder screw or valve 22a for a purpose which will hereinafter more freely appear.

The Bourdon tube base 21 is provided with a passageway 35 which communicates with an orifice 36 extending from a central bore 37 in the upstanding neck 18 through the face 19 of the neck. The opening 37 communicates through a pressure sensing probe assembly generally designated 38, with fluid under pressure in the pipe 3 so that variations in the fluid pressure will be indicated by the pointer 23 with reference to the dial face 7.

The pressure sensing probe in the illustrative embodiment comprises a head 39 having a neck 40 threaded into a bore in the cylindrical section 4 of the body 1, there being a pasage 41 through the neck 40. Carried by the head is a tubular, flexible body 42, preferably composed of beryllium copper, this body being closed at its base by a closure 43 having a bleeder screw or valve 43a. The body 42 provides a durable yet sensitive flexible means responsive to pressure variations in the pipe 3, whereby such variations are effective to cause liquid transfer through passage 41, and through a port 41a leading to the bore 37 between the Bourdon tube 22 and body 42, via port 36, passage 35 and a port 35a leading from passage 35 into the Bourdon tube 22, as best seen in FIG. 3. The metallic body 42 has been found to have significantly less effect on the accuracy of a gauge than rubber diaphragms heretofore used, and in addition, is longer lived.

Extending into the bore 37 and threadedly engaged in a tapered thread 37a is a damper stem 44, this stem being rotatably disposed in the bore 37 and retained therein by a threaded sleeve 45 threaded as at 45a to the neck 18. The upper extremity of the stem 44 is disposed in proximity to a plug 46 threaded into a tapped hole 47 in the housing 5, and in addition, is provided with tool receiving means such as a cross slot 44a whereby to enable adjustment of the stem longitudinally of the bore, thereby to vary the restriction to liquid flow through the tapered thread 37a.

The sleeve 45 also is provided with appropriate tool receiving means such as slots 45a whereby it may be threadedly adjusted in the neck 18. In this connection, it will be noted that the stem 44 is provided with an enlarged diameter section 44b slidable in the bore 37, while the stem above the body is of a reduced diameter so as to provide a shoulder 44c. The inner extremity of the sleeve 45 abuts with the shoulder 44c to limit outward movement of the damper stem 44, so that once the sleeve 45 is set in a selected position, the stem 44 cannot be backed out of the tapered thread 37a beyond a predetermined limit. Accordingly, the gauge cannot inadvertently be rendered susceptible to damage by excessive pressure surges due to excessive clearance between the damper stem and thread 37a.

The enlarged diameter section 44b of the damper is preferably sealed in the bore 37 as by a resilient sealing gasket or O-rings 44d.

As has been previously mentioned, pressure gauges of the type here involved are desirably filled with liquid such as oil or the like, so as to cushion sudden movements of the Bourdon tube and indicating means, and so as to maintain the moving parts constantly lubricated. However, due to temperature fluctuations, it has heretofore been impractical to completely fill the gauge housings with liquid with the result that an unsightly fluid level has been visible through the sight opening. In view of the present invention, however, the housing 5 may be completely filled with fluid such as oil through the filler opening 46 which, in accordance with one of the features of the invention, is located above the damper stem 44 so that the screw driver or other tool may be inserted through the filler opening 46 when the plug 47 is removed therefrom, so as to effect adjustment of the damper stem 44.

With particular reference to FIG. 3, a bladder 48 is disposed in the housing, the bladder having a stem 49 threadedly mounted in an opening in the rear wall of the housing 5. The bladder stem is ported as at 49a and thereby vented to atmosphere. Therefore, with the housing filled with liquid, thermal expansion of the liquid will cause compression of the bladder and the buildup of liquid volume will be vented. Because the housing is full, no unsightly liquid level will be visible through the transparent closure 11.

As previously referred to, the pressure gauge hydraulic system is adapted to be filled at a point intermediate the probe bleed valve 43a and Bourdon tube bleed 22a. Accordingly, in the Bourdon tube mounting base 21 a fill port 50 is provided, this port being tapped to receive a plug 51. With such an arrangement, the plug 51 may be removed, the damper stem retainer sleeve 45 loosened and the damper stem backed off, and one or the other of the bleeds 43a and 22a may be opened, as liquid is pumped into the system through the filler port 50. With the open bleed 43a or 22a, as the case may be, disposed uppermost, air will be effectively bled from the system, and if desired, the other bleed may be opened temporarily to facilitate and assure bleeding off of all air. Upon completely filling the system, the plug 51 will be replaced and the damper stem screwed home, with the bleed 43a open to eliminate a pressure buildup due to the displacement of liquid by the stem 44 as it moves downwardly in the bore.

It should now be apparent that the invention provides a gauge which may be quickly filled without concern as to leaving expansion space, since such expansion space is provided by the bladder. Adjustment of the damping stem may be readily accomplished through the filler opening. The sensing means is not susceptible of displacement due to excessive negative pressure in the conduit 3, and the pressure response system may be easily and effectively filled and bled. All of these features combine to provide a gauge which is extremely simple to install and maintain and which is more appealing aesthetically than gauges of this type heretofore available.

While the specific details have been herein shown and described, changes and alterations may be resorted to without departing from the spirit of the invention as defined in the appended claims.

We claim:

1. A pressure gauge of the class described comprising: a housing having face and back walls and a base adapted to be connected to a source of pressure fluid; fluid pressure indicating means in said housing; said base having an internal member extending inwardly in said housing and provided with a flat face disposed substantially parallel to said face and back walls; said indicating means including a supporting member having a flat face disposed in opposed relation to the flat face of said internal base member; said internal base member having a fluid passageway extending longitudinally therethrough and laterally through the flat face of said internal base member; said indicating means supporting member having a fluid passageway communicating through the flat face of said indicating means supporting member with the fluid passageway in said internal base member; means providing a seal between said opposed flat faces extending circumferentially about the juncture of the fluid passageway in said members; and means connecting said members together said internal base member being provided with a damper screw, entirely within said housing extending axially of said longitudinally extended passage from within said housing and extending past said fluid passageway through said flat face of said internal base member.

2. A pressure gauge as defined in claim 1, wherein said housing is filled with fluid and said housing is provided with a filler opening aligned with said damper screw.

References Cited in the file of this patent

UNITED STATES PATENTS

| | | |
|---|---|---|
| 256,814 | Ashcroft | Apr. 25, 1882 |
| 1,200,454 | Bate | Oct. 10, 1916 |
| 1,494,496 | Manning | May 20, 1924 |
| 2,006,712 | Forbes et al. | July 2, 1935 |
| 2,037,949 | Tate | Apr. 21, 1936 |
| 2,125,016 | Gruver | July 26, 1938 |
| 2,127,807 | Carbonara | Aug. 23, 1938 |
| 2,162,308 | Jenny | June 13, 1939 |
| 2,216,374 | Martin | Oct. 1, 1940 |
| 2,244,335 | Hopkins | June 3, 1941 |
| 2,591,148 | Green | Apr. 1, 1952 |
| 2,656,723 | Heise | Oct. 27, 1953 |
| 2,773,388 | Prosser | Dec. 11, 1956 |

FOREIGN PATENTS

| | | |
|---|---|---|
| 190,814 | Great Britain | Jan. 1, 1934 |
| 264,873 | Great Britain | June 23, 1927 |